United States Patent [19]

D'Anna

[11] Patent Number: 5,492,003
[45] Date of Patent: Feb. 20, 1996

[54] ELECTRONIC GAP MEASURING TOOL

[75] Inventor: Joseph S. D'Anna, Smithtown, N.Y.

[73] Assignee: Northrop Grumman Corporation, Los Angeles, Calif.

[21] Appl. No.: 344,501

[22] Filed: Nov. 23, 1994

[51] Int. Cl.$^6$ .................................................. G01B 7/02
[52] U.S. Cl. .................................................. 73/1 J; 33/784
[58] Field of Search .................................. 73/1 J; 33/711, 33/783, 784, 787, 792–796, 802, 805, 806, 811, 812, 838

[56] References Cited

U.S. PATENT DOCUMENTS

| | | | |
|---|---|---|---|
| 2,646,627 | 7/1953 | Tillyer et al. | 33/794 |
| 4,283,857 | 8/1981 | Graham et al. | 73/1 J |
| 4,345,380 | 8/1982 | Vis | 33/784 |
| 4,875,294 | 10/1989 | Jefferson | 33/792 |

Primary Examiner—Robert Raevis
Attorney, Agent, or Firm—Terry J. Anderson; Karl J. Hoch, Jr.

[57] ABSTRACT

An electronic gap measuring tool which is inserted into a gap, and then gives an instantaneous digital readout on a depth gage. The digital data on the reading can be entered into an electronic data collector, resulting in a paperless data collection system. The electronic gap measuring tool includes a tool housing and a longitudinally displaceable shaft supported within the tool housing. A roller is mounted to the lower end of the longitudinally displaceable shaft, and a lateral extension is secured to the longitudinally displaceable shaft, such that the roller and lateral extension are longitudinally displaceable therewith. A measuring tab is defined at a lower end of the tool housing, such that a gap to be measured is defined between the measuring tab and the longitudinally displaceable roller. A digital gage is secured to the housing and has a measuring probe which contacts and is biased against the lateral extension to measure any displacements of the lateral extension and roller, such that the digital gage produces a direct digital reading of the gap defined between the measuring tab and the longitudinally displaceable roller.

9 Claims, 2 Drawing Sheets

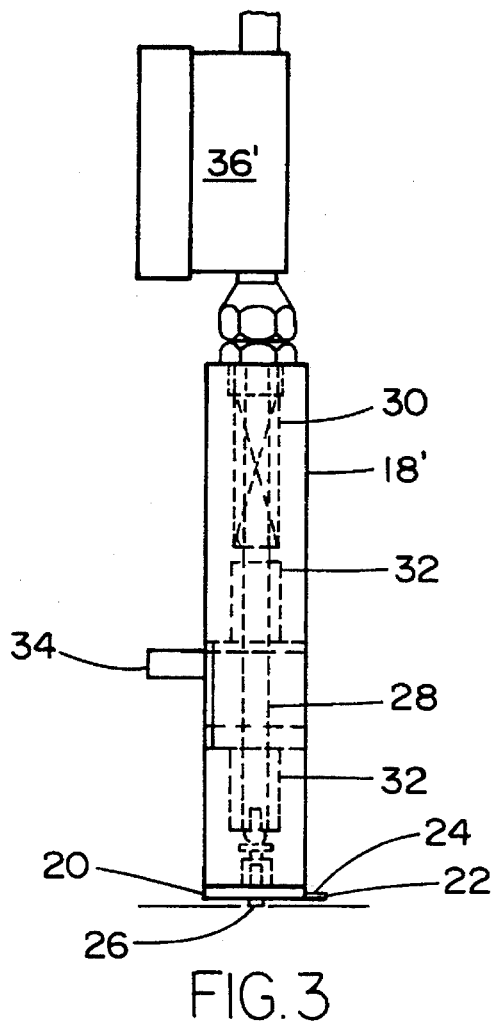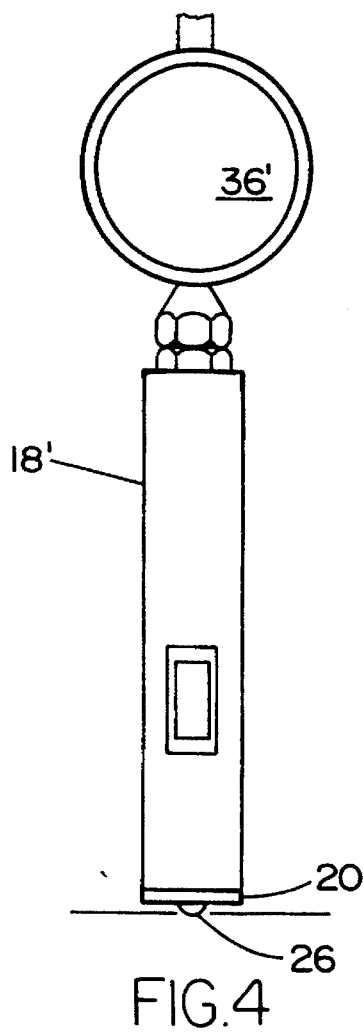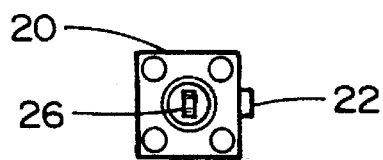

ELECTRONIC GAP MEASURING TOOL

BACKGROUND OF THE INVENTION

1. Field of the Invention

The present invention relates generally to an electronic gap measuring tool which is inserted into a gap being measured, and more particularly pertains to an electronic gap measuring tool which produces an instantaneous digital readout of the measurement on a digital gage.

2. Discussion of the Prior Art

One current method of constructing an aircraft ensures that the contour of the skin of the aircraft is proper by comparing the contour of the skin with the contour of a master contour board of an assembly tool. The master contour board is spaced from the aircraft skin, and the gap therebetween is measured in a sequence of gap measurements to ensure that the contour of the aircraft skin matches and follows the contour of the master contour board of the assembly tool.

One current prior art method for taking the sequence of gap measurements between the master contour board of the assembly tool and the part surface uses flat feeler gages of various thicknesses which are selectively combined and inserted into each gap until a proper combination thereof fills the gap with little free movement. The flat feeler gages are then removed, and the thicknesses of all of the gages (stamped on each gage) are added to determine the width of the particular measured gap. The data is then manually recorded on an Assembly Inspection Criteria Sheet for each point of measurement and for each part or unit assembled with that assembly tool. The trial and error insertion of the flat feeler gages takes time, and typically takes several attempts before the right combination of flat feeler gages is achieved. The gage thicknesses are then added manually to determine the gap, and the manual addition introduces a further potential for error. The data is then manually recorded on the Assembly Inspection Criteria Sheet. Moreover, the accuracy of each reading can vary in dependence upon the skill and dexterity of the individual taking the reading.

SUMMARY OF THE INVENTION

Accordingly, it is a primary object of the present invention to provide an electronic gap measuring tool which is inserted into a gap, and then gives an instantaneous digital readout on a depth gage.

A further object of the subject invention is the provision of an electronic gap measuring tool wherein data is entered into an electronic data collector, resulting in a paperless data collection system.

Pursuant to the teachings herein, the present invention provides an electronic gap measuring tool which includes a tool housing and a longitudinally displaceable shaft supported within the tool housing. A roller is mounted to the lower end of the longitudinally displaceable shaft, and a lateral extension is secured to the longitudinally displaceable shaft, such that the roller and lateral extension are longitudinally displaceable therewith. A measuring tab is defined at a lower end of the tool housing, such that a gap to be measured is defined between the measuring tab and the longitudinally displaceable roller. A digital gage is secured to the housing and has a measuring probe which contacts and is biased against the lateral extension to measure any displacements of the lateral extension and roller, such that the digital gage produces a direct digital reading of the gap defined between the measuring tab and the longitudinally displaceable roller.

In greater detail, a spring in the tool housing biases downwardly the longitudinally displaceable shaft and the roller mounted at the lower end of the longitudinally displaceable shaft. The longitudinally displaceable shaft is mounted within low friction ball bushings for longitudinal movement within the tool housing, and the lateral extension is pinned thereto. The digital gage is preferably a commercially available digital depth gage which is mounted to the tool housing by a releasable bracket and fasteners. The measuring probe of the gage contacts one end of an adjustment screw which is threadedly engaged in the lateral extension, and the adjustment screw is locked in place relative to the lateral extension by a lock nut. The data collection is preferably performed electronically with a commercially available data collection unit connected directly to the digital gage, which results in a completely paperless electronic data collection system.

The present invention also provides a method of calibrating the electronic measuring tool wherein the tool is calibrated with the aid of a known precise calibration gap. The tool is positioned to measure the calibration gap by placing the top surface of the toe on one side of the calibration gap and by placing the roller against a second side of the calibration gap. The position of the digital gage relative to the bracket is then longitudinally adjusted until a reading of approximately the calibration gap is shown on the digital gage. The fasteners for the releasable bracket are then tightened to secure the digital gage securely to the tool housing. The lock nut is then loosened, and the adjustment screw is turned to obtain a reading of precisely the calibration gap on the digital gage. During the final adjustment, the measuring tool is rotated slightly about the toe such that the roller rolls slightly back and forth while the digital gage is observed for the lowest reading, which is given when the toe and roller are positioned precisely orthogonally across the gap. The adjustment screw is then adjusted until the lowest reading on the digitial gage is the calibration gap, and then the lock nut is tightened against the lateral extension.

BRIEF DESCRIPTION OF THE DRAWINGS

The foregoing objects and advantages of the present invention for an electronic gap measuring tool may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 3 and 4 are respectively a side elevational view and a front elevational view of a second embodiment of an electronic gap measuring tool wherein a digital depth gage is mounted on top of the tool body; and FIG. 5 is a bottom plan view of the main tool body shown in FIG. 3.

DETAILED DESCRIPTION OF THE DRAWINGS

Figure 1:
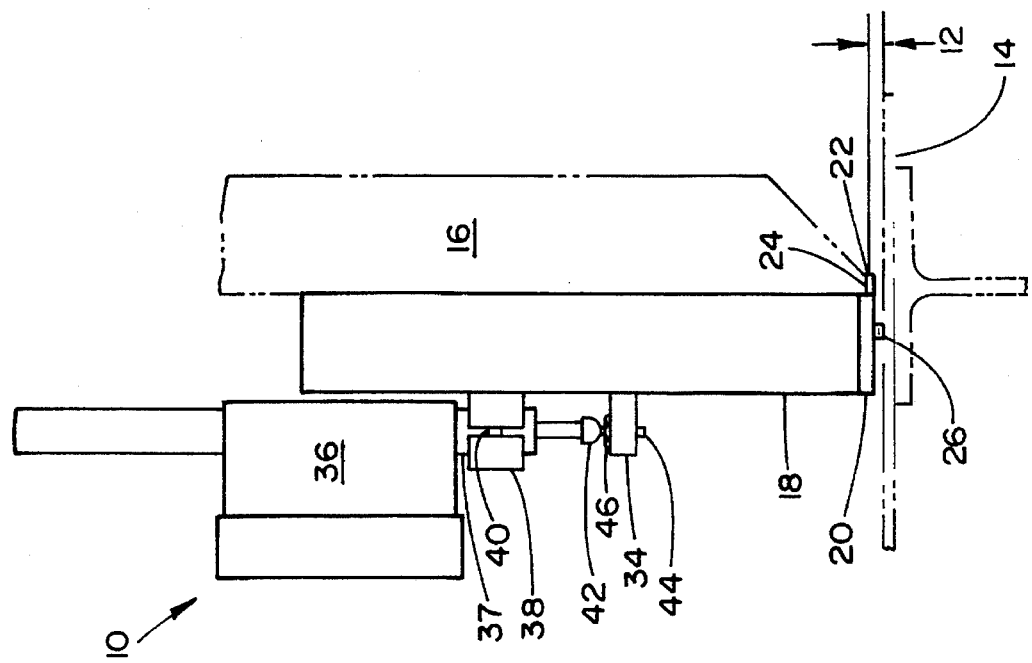
FIG. 1 is a side elevational view of a first exemplary embodiment of an electronic gap measuring tool constructed pursuant to the teachings of the present invention wherein a digital depth gage is mounted on one side of the tool body.

Referring to the drawings in detail, FIG. 1 illustrates an electronic gap measuring tool 10 for measuring a gap 12 between the exterior of an aircraft skin 14 and a master contour board 16 of an assembly tool. One current method of constructing an aircraft ensures that the contour of the skin 14 of the aircraft is proper by comparing the contour of the skin with the contour of a master contour board 16 of an assembly tool. As illustrated in FIG. 1, the master contour board 16 is spaced from the aircraft skin 14, and the gap 12 therebetween is measured in a sequence of gap measurements to ensure that the contour of the aircraft skin matches and precisely follows the contour of the master contour board of the assembly tool.

The electronic gap measuring tool 10 includes a main tool body 18 which has a generally square cross-sectional shape, as indicated by the bottom plan view of FIG. 5. A bottom piece 20 has a projecting tab or toe 22, the top surface 24 of which contacts a first upper side of the gap being measured, as illustrated generally in FIG. 1. A spring loaded roller 26 contacts a second lower side of the gap being measured. The roller 26 is mounted at the lower end of a central shaft 28, FIG. 3, which is biased downwardly by an internal spring 30. The central shaft 28 is mounted within several low friction ball bushings 32 for longitudinal movement within the housing. A lever 34 is attached to the central shaft 28 for longitudinal movement therewith and also with roller 26. Thus, roller 26 is biased by spring 30 against the second lower side of the gap being measured, and any longitudinal movements of roller 26 are translated by shaft 28 to be longitudinal movements of the lever 34.

Figure 2:
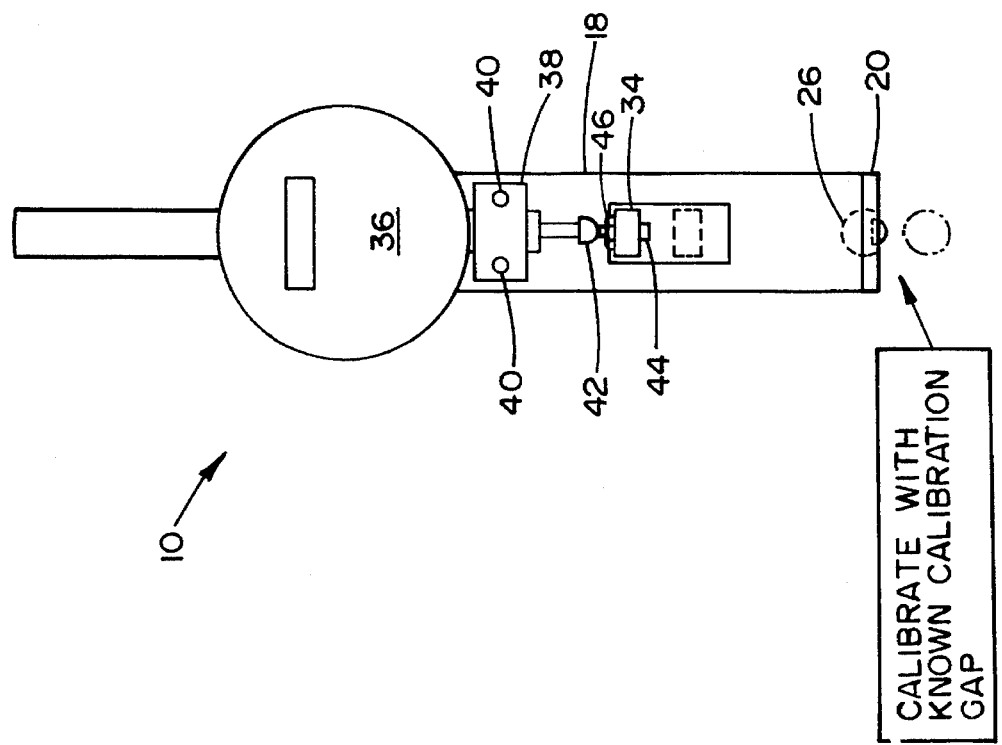
FIG. 2 illustrates a front elevational view of the electronic gap measuring tool shown in FIG. 1.

In the embodiment of FIGS. 1 and 2, a commercially available digital depth gage 36 is mounted to the side of the main tool body 18 by a bracket 38 and screws 40. The gage 36 has a longitudinally displaceable measuring probe 42 biased against lever 34 to measure any displacements of lever 34, which also measure any displacements of roller 26, and result in a measurement of the width of the gap being measured. The measuring probe 42 contacts the end of an adjustment screw 44 which is threadedly engaged in lever 34. The adjustment screw 44 is locked in place relative to the lever 34 by a lock nut 46.

In the embodiment of FIGS. 3–5, a commercially available digital depth gage 36 is mounted on the top of the tool body 18' and the measuring probe thereof extends internally of the tool body 18' and moves up and down with the roller 26 and shaft 28.

The electronic gap measuring tool 10 is initially calibrated with the aid of a calibration set master which defines a precise known gap, such as 0.1250 inches. The tool 10 is first positioned to measure the precise known gap of the calibration set master by placing the top surface 24 of toe 22 on one side of the gap and by placing the roller 26 against the second side of the gap, and then by longitudinally adjusting the position of the shaft 37 of the digital depth gage 36 relative to the bracket 38 until a read of approximately 0.1250 inches is shown on the digital depth gage. The screws 40 are then tightened to secure the digital depth gage securely to the main tool body 18. Lock nut 46 is then loosened, and the adjustment screw 44 is turned to obtain a precise reading of 0.1250 inches on the digital depth gage. During the final adjustment, the measuring toe 22 and roller 26 must be positioned precisely orthogonally across the gap. To ensure that position, during the measurement the measuring tool is rotated slightly about the toe 22 such that the roller 26 rolls slightly back and forth while the depth gage is observed for the lowest measurement, which is given when the toe 22 and roller 26 are positioned precisely orthogonally across the gap. The adjustment screw 44 is then adjusted until the lowest measurement on the gage is precisely 0.1250 inches, and then lock nut 46 is tightened against the lever 34, and the tool is calibrated.

During an actual measurement of a gap with the tool, the measuring tool is rotated slightly relative to the toe 22, as in the calibration setting, and the smallest displayed measurement is taken as the actual measurement.

The electronic gap measuring tool of the present invention includes a tool body 18, which is approximately 1"×1"×4.5" long. When the tool body is held vertically, a flat toe approximately 0.050" thick protrudes from one face at the bottom of the body. A spring loaded roller also protrudes vertically from the center of the body for approximately 0.5 inches. A movable lever protrudes from a face opposite the toe. A commercially available off-the-shelf digital depth gage is mounted on the tool body near the protruding lever. The electronic gap measuring tool of the present invention is calibrated by using a set master with a known gap dimension, and by sliding the depth gage into the set master until the digital reading on the depth gage matches the known gap dimension of the set master.

In usage, the body of the tool is manually grasped, and the toe is inserted into the gap until the body is flat against a contour of the assembly tool 16, as illustrated in FIG. 1. The spring loaded roller contacts the aircraft skin and is compressed, moving the lever 34 and the probe 42 of the depth gage. The tool is rotated back and forth slightly by pivoting about the toe 22 with a slight upward force until the lowest digital reading is attained.

The digital depth gage is preferably a commercially available instrument which presents a digital reading display, such as is available commercially from many manufacturers such as Mitutoyo and Starrett. Moreover, the data collection pursuant to the present invention is preferably performed electronically, with the instrument connected directly to a commercially available data collector, such as is commercially available from Mitutoyo and Starrett, which results in a completely paperless electronic data collection system.

While several embodiments and variations of the present invention for an electronic gap measuring tool are described in detail herein, it should be apparent that the disclosure and teachings of the present invention will suggest many alternative designs to those skilled in the art.

What is claimed is:

1. An electronic gap measuring tool comprising: a tool housing; a longitudinally displaceable shaft supported in said tool housing for displacement along a longitudinal axis of the tool housing; a roller mounted at a lower end of said longitudinally displaceable shaft to be longitudinally displaceable therewith; a measuring tab defined at a lower end of said tool housing, wherein a gap to be measured is defined between said measuring tab and the longitudinally displaceable roller; a lateral extension secured to said longitudinally displaceable shaft for displacement therewith along the longitudinal axis; and a digital gage secured to said housing, said digital gage having a measuring probe which is displaceable along the longitudinal axis of the tool housing and which contacts and is biased against said lateral extension to measure any longitudinal displacements of the lateral extension which also measures any longitudinal displacements of the roller, and results in a measurement of the width of the gap, such that the digital gage produces a direct digital reading of the gap defined between the measuring tab and the longitudinally displaceable roller.

2. An electronic gap measuring tool as claimed in claim 1, wherein a spring in said tool housing biases downwardly the longitudinal displaceable shaft and the roller mounted at the lower end of the longitudinally displaceable shaft.

3. An electronic gap measuring tool as claimed in claim 2, wherein the longitudinally displaceable shaft is mounted within low friction ball bushings for longitudinal movement within the tool housing.

4. An electronic gap measuring tool as claimed in claim 1, wherein the lateral extension is attached to the longitudinally displaceable shaft for longitudinal movement therewith.

5. An electronic gap measuring tool as claimed in claim 1, wherein said digital gage is a commercially available digital depth gage.

6. An electronic gap measuring tool as claimed in claim 5, wherein said commercially available digital depth gage is mounted to the tool housing by a releasable bracket and fasteners.

7. An electronic gap measuring tool as claimed in claim 6, wherein the measuring probe contacts one end of an adjustment screw which is threadedly engaged in the lateral extension, and the adjustment screw is locked in place relative to the lateral extension by a lock nut.

8. A method of calibrating an electronic measuring tool as claimed in claim 7, wherein the electronic gap measuring tool is calibrated with the aid of a known precise calibration gap, wherein the tool is positioned to measure the calibration gap by placing the top surface of the toe on one side of the calibration gap and by placing the roller against a second side of the calibration gap, and then by longitudinally adjusting the position of the digital gage relative to the bracket until a reading of approximately the calibration gap is shown on the digital gage, the fasteners for the releasable bracket are then tightened to secure the digital gage securely to the tool housing, the lock nut is then loosened, and the adjustment screw is turned to obtain a reading of precisely the calibration gap on the digital gage, and during the final adjustment the measuring tool is rotated slightly about the toe such that the roller rolls slightly back and forth while the digital gage is observed for the lowest reading, which is given when the toe and roller are positioned precisely orthogonally across the gap, the adjustment screw is then adjusted until the lowest reading on the digital gage is the calibration gap, and then the lock nut is tightened against the lateral extension.

9. An electronic gap measuring tool as claimed in claim 1, wherein the data collection is performed electronically with a commercially available data collection unit connected directly to the digital gage which results in a completely paperless electronic data collection system.

* * * * *